US009835095B2

(12) United States Patent
Hall et al.

(10) Patent No.: US 9,835,095 B2
(45) Date of Patent: Dec. 5, 2017

(54) ELECTRONIC SWITCHING MODULE FOR MULTIPLE VEHICLE CONTROLS

(71) Applicant: Fontaine Modification Company, Charlotte, NC (US)

(72) Inventors: Brandon Hall, Concord, NC (US); Howard Moore, Seymour, IN (US)

(73) Assignee: Fontaine Modification Company, Charlotte, NC (US)

( * ) Notice: Subject to any disclaimer, the term of this patent is extended or adjusted under 35 U.S.C. 154(b) by 158 days.

(21) Appl. No.: 14/696,018

(22) Filed: Apr. 24, 2015

(65) Prior Publication Data

US 2015/0308354 A1    Oct. 29, 2015

Related U.S. Application Data

(60) Provisional application No. 61/983,611, filed on Apr. 24, 2014.

(51) Int. Cl.
F02D 11/10    (2006.01)
F02D 41/00    (2006.01)
(Continued)

(52) U.S. Cl.
CPC ............ *F02D 11/105* (2013.01); *F02D 11/02* (2013.01); *F02D 11/106* (2013.01);
(Continued)

(58) Field of Classification Search
CPC ...... F02D 11/02; F02D 11/106; F02D 11/107; F02D 2009/0201; F02D 2009/0213;
(Continued)

(56) References Cited

U.S. PATENT DOCUMENTS 2,512,876 A    6/1950  Rice
3,512,270 A    5/1970  Chedister
(Continued)

FOREIGN PATENT DOCUMENTS

CN    2815762 Y  *  9/2006  ............. B60K 26/02
CN    201013461 Y  *  1/2008  ............. F02D 41/26
(Continued)

*Primary Examiner* — Sizo Vilakazi
*Assistant Examiner* — Kevin R Steckbauer
(74) *Attorney, Agent, or Firm* — Andrus Intellectual Property Law, LLP

(57) ABSTRACT

An electronic switching module for connecting first and second throttle assemblies to an electronic control module of a vehicle that controls an engine of the vehicle includes first throttle assembly ports adapted to receive first throttle primary sensor position data and first throttle secondary sensor position data and second throttle assembly ports adapted to receive second throttle primary sensor position data and second throttle secondary sensor position data. A controller is connected to the first and second throttle assembly ports and an electronic control module port and is adapted to receive and compare the first throttle primary sensor position data and the first throttle secondary sensor position data and send an engine idle signal to the electronic control module via the electronic control module port when the comparison does not show a first predetermined relationship. The controller is also adapted to receive and compare the second throttle primary sensor position data and the second throttle secondary sensor position data and send an engine idle signal to the electronic control module via the electronic control module port when the comparison does not show a second predetermined relationship.

16 Claims, 5 Drawing Sheets

(51) Int. Cl.
*F02D 11/02* (2006.01)
*F02D 11/00* (2006.01)
*F02D 41/22* (2006.01)

(52) U.S. Cl.
CPC ........ *F02D 11/107* (2013.01); *F02D 41/0002* (2013.01); *F02D 11/00* (2013.01); *F02D 2041/228* (2013.01); *F02D 2200/0404* (2013.01); *F02D 2200/602* (2013.01); *Y02T 10/42* (2013.01)

(58) Field of Classification Search
CPC ....... F02D 2009/022; F02D 2009/0235; F02D 2009/0255; F02D 2009/0277; F02D 2009/0281; F02D 2009/0294; F02D 2009/0296; F02D 2009/0298; F02D 2007/025; B60K 41/002
See application file for complete search history.

(56) References Cited

U.S. PATENT DOCUMENTS

| | | | |
|---|---|---|---|
| 4,119,166 A | 10/1978 | Ayotte et al. | |
| 4,921,066 A | 5/1990 | Conley | |
| 5,449,956 A * | 9/1995 | Williams | B60K 26/00 123/396 |
| 5,995,879 A * | 11/1999 | Ginzel | F02D 31/001 123/333 |
| 6,065,448 A * | 5/2000 | Hatton | F02D 11/10 123/396 |
| 6,116,214 A * | 9/2000 | Ishida | F02D 11/107 123/198 D |
| 6,339,741 B1 * | 1/2002 | Ritter | F02D 29/04 123/350 |
| 6,405,669 B2 | 6/2002 | Rheault et al. | |
| 6,672,281 B1 * | 1/2004 | Cinpinski | B60W 30/18 123/396 |
| 6,805,094 B2 * | 10/2004 | Hashimoto | F02D 11/105 123/396 |
| 8,930,050 B2 * | 1/2015 | Garon | F02D 11/106 440/87 |
| 8,948,998 B2 * | 2/2015 | Smith | F02D 11/105 123/399 |
| 2003/0221668 A1 * | 12/2003 | Hashimoto | F02D 11/105 123/396 |
| 2006/0085117 A1 | 4/2006 | Stummer | |
| 2010/0280685 A1 * | 11/2010 | Garon | F02D 41/2464 701/21 |
| 2013/0158836 A1 * | 6/2013 | Smith | F02D 11/105 701/103 |
| 2013/0173138 A1 * | 7/2013 | Vasichek | F02D 41/2422 701/102 |
| 2014/0379229 A1 | 12/2014 | Walz et al. | |

FOREIGN PATENT DOCUMENTS

| | | | | | |
|---|---|---|---|---|---|
| CN | 202115361 U | * | 1/2012 | ............ | B60K 26/02 |
| CN | 103029584 A | * | 4/2013 | ............ | B60K 26/04 |
| CN | 202900426 U | * | 4/2013 | ............ | F02D 41/02 |
| CN | 204045055 U | * | 12/2014 | ............ | G09B 9/04 |
| CN | 204452554 U | * | 7/2015 | ............ | B62D 1/04 |
| JP | 59192845 A | * | 11/1984 | ............ | F02D 11/00 |
| JP | 06191314 A | * | 7/1994 | ............ | B60K 26/00 |
| KR | 101529004 B1 | * | 6/2015 | ............ | B60K 26/02 |

* cited by examiner

ELECTRONIC SWITCHING MODULE FOR MULTIPLE VEHICLE CONTROLS

CROSS REFERENCE TO RELATED APPLICATIONS

This application claims priority to U.S. Provisional Patent Application No. 61/983,611 filed Apr. 24, 2014, the entire contents of which are hereby incorporated by reference.

FIELD OF THE INVENTION

The present invention relates generally to industrial, commercial or governmental vehicles and, in particular, to an electronic switching module for multiple vehicle controls.

BACKGROUND

It is desirable to provide certain types of industrial, commercial or governmental vehicles with two or more sets of controls for driving and/or operating the vehicle. For example, a street sweeper, garbage truck or postal vehicle may require a second set of controls so that the operator may easily and conveniently service both sides of a street. Such vehicles are known as "dual steer" vehicles. Each set of controls for driving and/or operating the vehicle typically must have its own throttle assembly.

Due to market limitations and cost considerations, many dual steer vehicles, or other vehicles with multiple controls, must be custom produced by retrofitting standard original equipment manufacturer (OEM) vehicles. Many such standard vehicles operate using "throttle-by-wire" systems where a computer or electronic control module interfaces with the throttle pedal or lever to control the vehicle engine speed. Such a setup makes retrofitting a standard OEM vehicle difficult as the OEM throttle-by-wire electronic module or computer must receive two or more sets of throttle inputs. This may "confuse" the OEM computer so that it malfunctions and shuts down or delivers error codes or warning lights to the vehicle dashboard or other instrumentation.

A need exists for a device or system that addresses at least some of these issues by providing a "clean" signal to the OEM computer/electronic control module. Such a device or system ideally would make the multiple vehicle throttle assemblies transparent to the ECM.

DETAILED DESCRIPTION OF EMBODIMENTS

Figure 1:
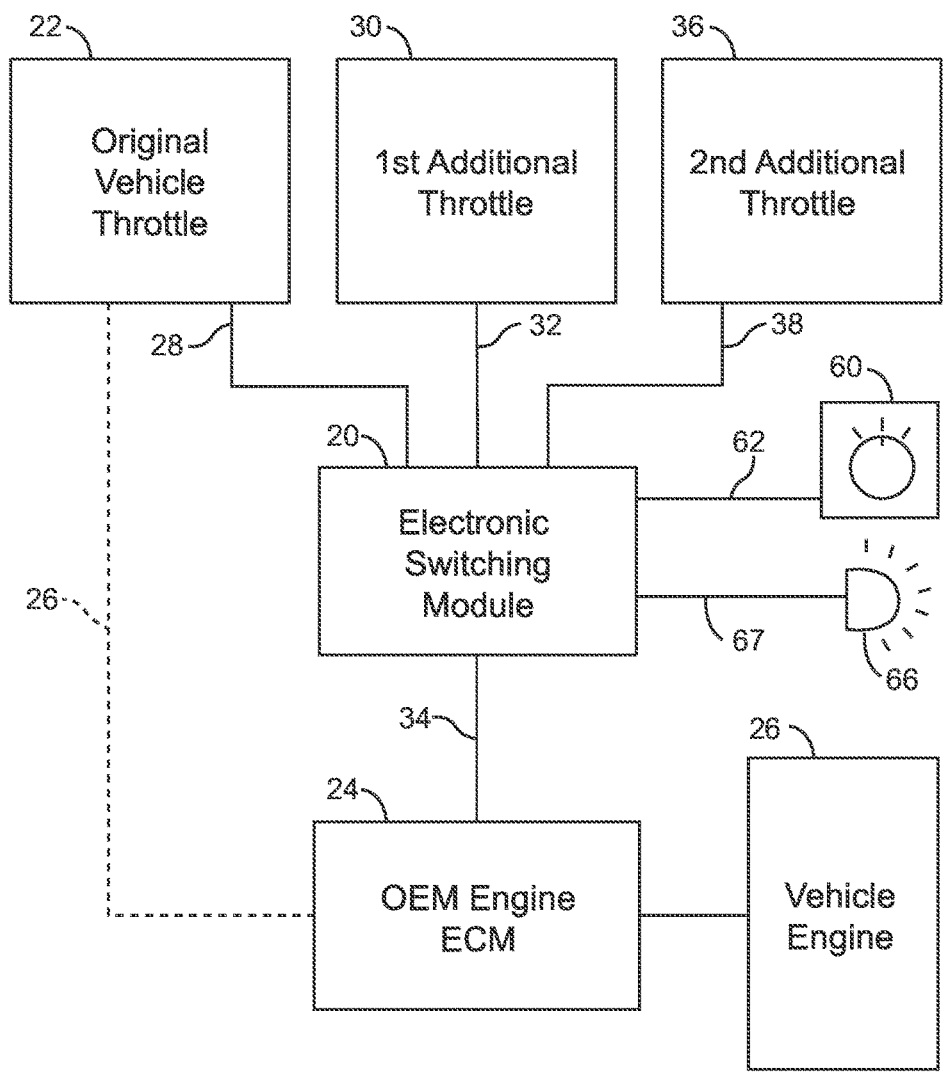
FIG. 1 is block diagram illustrating an example of a vehicle system that incorporates an embodiment of the electronic switching module of the present invention.
Figure 2:
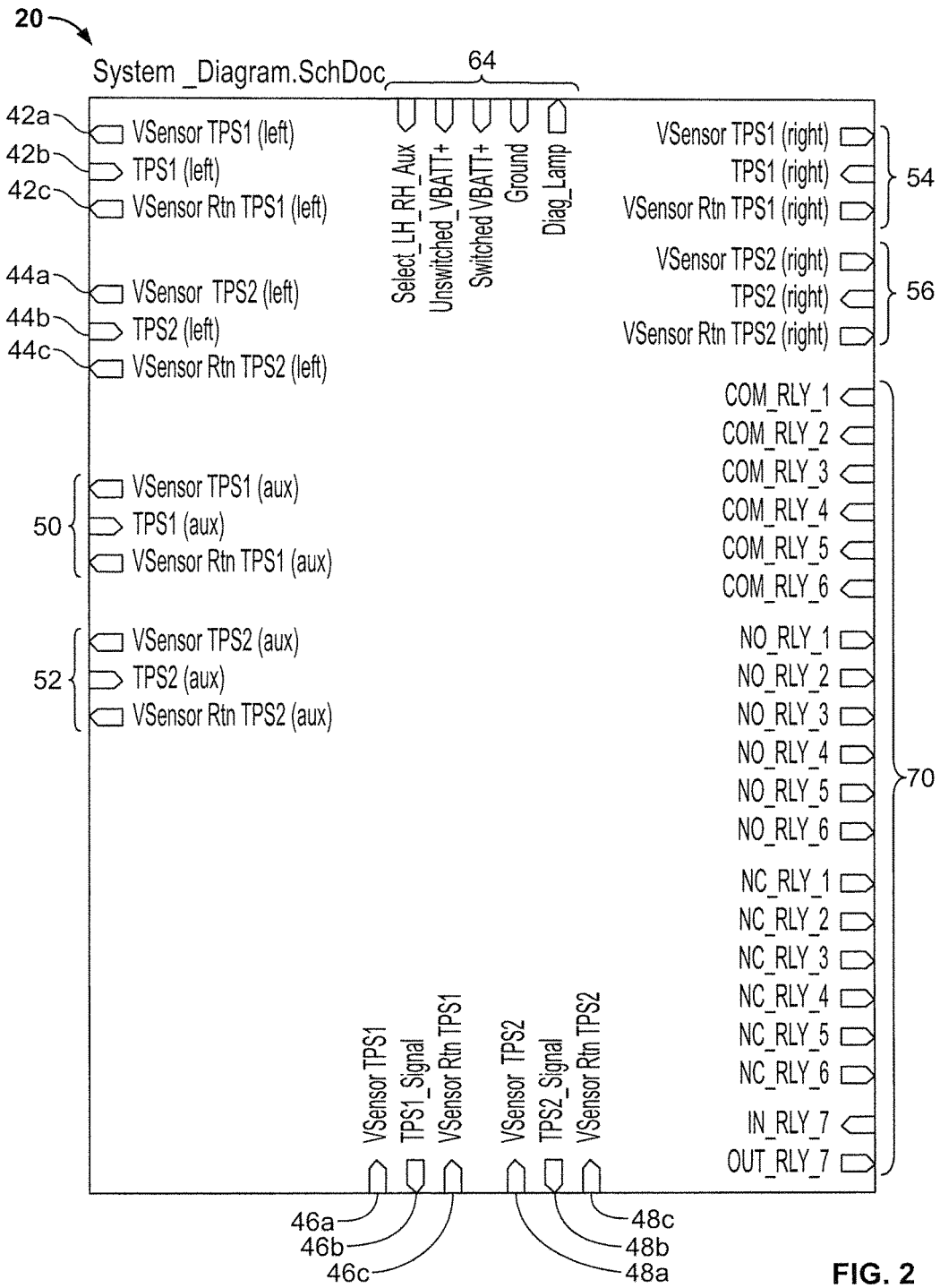
FIG. 2 is a block diagram illustrating the inputs and outputs of the electronic switching module of FIG. 1.
Figure 3A:
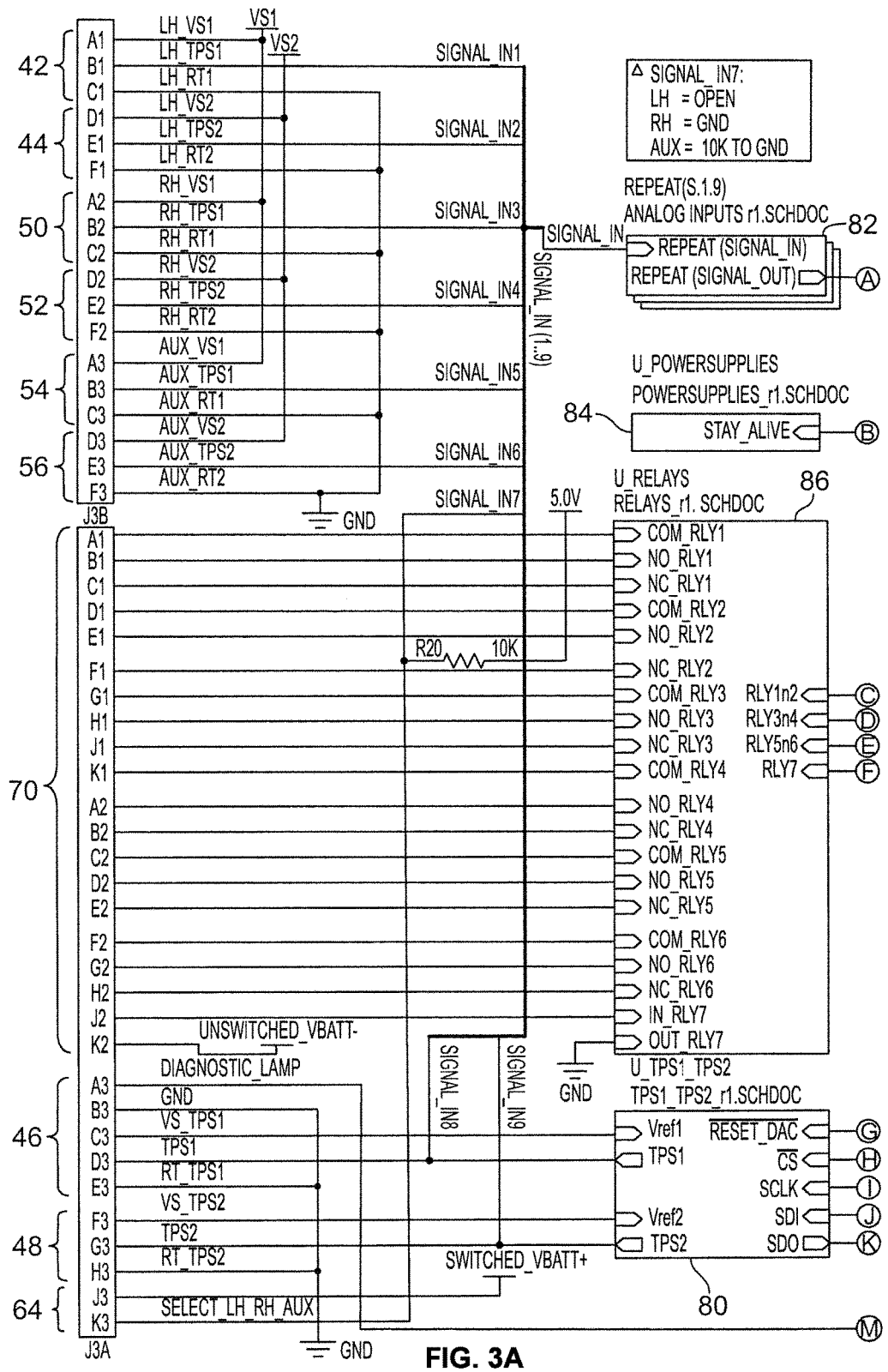
FIGS. 3A and 3B are block diagrams and schematics illustrating the architecture of the electronic switching module of FIGS. 1 and 2.
Figure 3B:
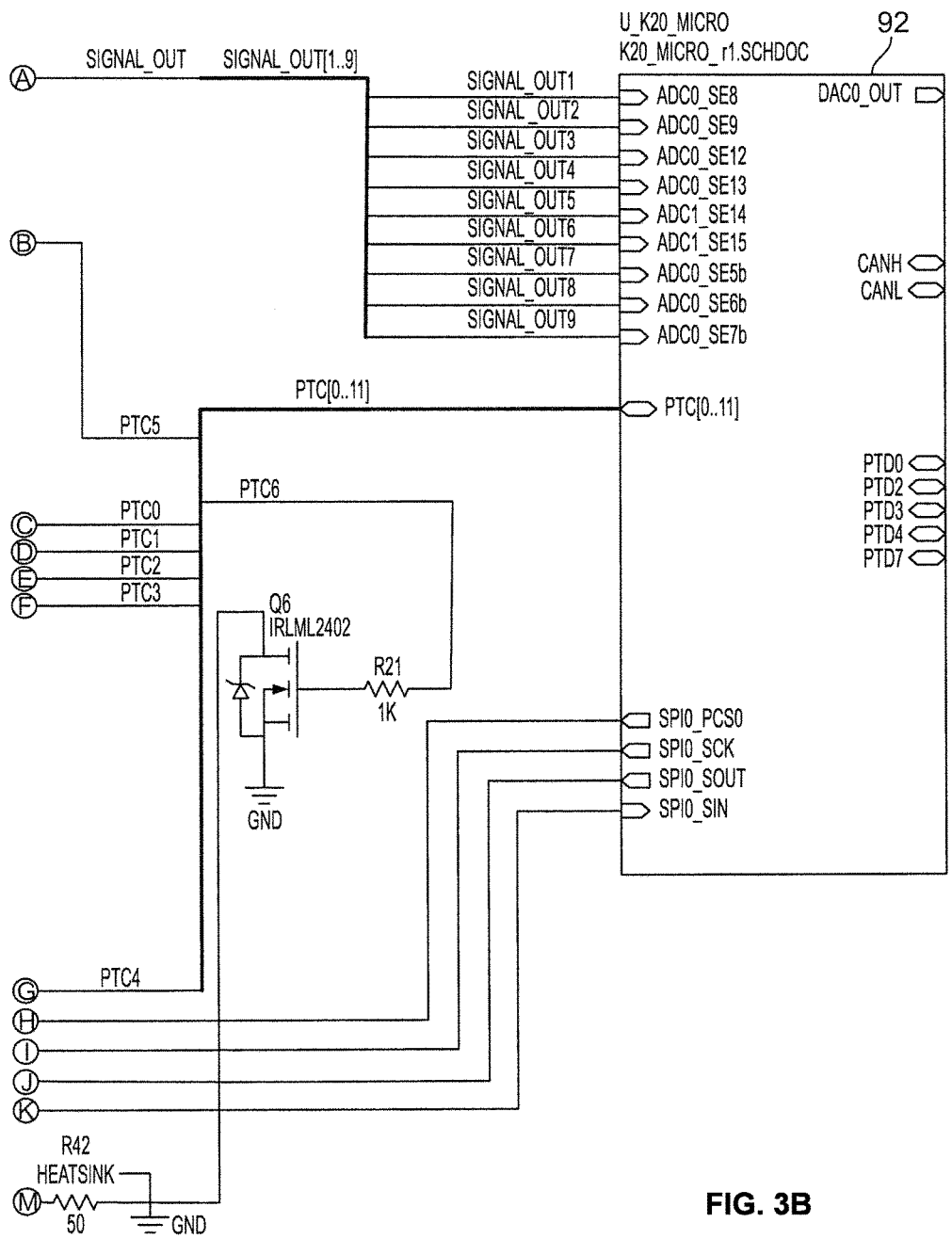

An embodiment of the electronic switching module of the invention is indicated at 20 in FIG. 1 and in general at 20 in FIGS. 2, 3A and 3B. As illustrated in FIG. 1, the original throttle assembly of a vehicle 22 is originally attached to the electronic control module (ECM) 24 of a vehicle via a direct throttle-by-wire line, illustrated in phantom. The ECM controls the vehicle engine 26. The ECM 24 receives an input from the throttle assembly 22 indicating the position of the throttle. The ECM then controls the speed of the vehicle engine 26 based upon the position of the throttle.

In accordance with an embodiment of the present invention, and with reference to FIG. 1, the original vehicle throttle assembly 22 is disconnected from the ECM 24 and is instead plugged into an embodiment of the electronic switching module 20 of the present invention via line 28. In addition, a second (or first additional) throttle assembly 30 is added to the vehicle such as via a second cab or standup box so that a dual steer vehicle is created. This second throttle 30 is connected to the electronic switching module 20 via line 32. The electronic switching module 20 is connected to the ECM 24 via line 34. Line 34 plugs into the ECM 24 at the same port that throttle-by-wire line 26 previously used. As a result, the speed of the vehicle engine 26, and thus the speed of the vehicle, may be controlled, under the direction of the electronic switching module 20, by either the original vehicle throttle 22 or the first additional throttle 30.

The illustrated embodiment of the electronic switching module 20 may also accommodate a third (or second additional) throttle 36 which is connected to the electronic switching module 20 via line 38. Alternative embodiments may accommodate only the first additional throttle assembly 30 or more than two additional throttle assemblies. In addition, the vehicle locations that include the additional throttle assemblies do not have to provide all of the same functions as the original vehicle cab.

With reference to FIG. 2, the original throttle assembly 22 of FIG. 1 plugs into the electronic switching module 20 using ports 42a-42c and 44a-44c (see also 42 and 44 in FIG. 3A). Ports 42a and 42c power a first or primary position sensor that is connected to the original throttle assembly 22 of FIG. 1, while ports 44a and 44c power a second or secondary position sensor, also connected to the original throttle assembly 22. The first and second (or primary and secondary) position sensors each sends a signal to the module 20 corresponding to a throttle position via ports 42b and 44b, respectively. The module 20 then compares the signals from ports 42b and 44b and, if they are in a ratio of 2:1 (or some other predetermined relationship), a signal is sent to the ECM directing it to adjust the vehicle engine speed accordingly. If the first and second throttle position sensors do not correlate to a 2:1 ratio, then there is a problem with one of the sensors. In such an error condition, the module 20 sends a signal to the engine ECM (24 in FIG. 1) via ports 46b and 48b, that indicates that the vehicle engine should be set to idle (no matter what the actual position of the vehicle throttle is). The module 20 is powered by ports 46a, 46c, 48a and 48c, which also plug into the engine ECM. The connection between the ECM ports 46a-46c and 48a-48c of module 20 of Fig. (ports also shown in general at 46 and 48 in FIG. 3A) are represented by line 34 of FIG. 1.

A second series of input and output ports, illustrated in FIGS. 2 and 3A at 50 and 52, are connected to a first additional throttle assembly (30 in FIG. 1), and operate, in the same manner that ports 42 and 44 are attached, and operate with regard to, to the original throttle assembly. More specifically, the first additional throttle assembly (30 of FIG. 1) features first and second position sensors which send signals to the module 20. If the signals correlate to a 2:1 ratio (or other predetermined relationship), the vehicle engine speed is adjusted based on the position of the throttle of the throttle assembly 30. If the signals from the first and second sensors of the first additional throttle assembly 30 of FIG. 1 do not correlate to the predetermined relationship, however, the module 20 sends a signal to the original equipment manufacturer (OEM) engine ECM indicating that the vehicle engine speed should be set to idle. The first additional throttle assembly could be present, for example, in a curbside cab or a standup box of a vehicle that permits the vehicle to be steered, or otherwise operated, from either side (i.e. a dual steer vehicle).

A third series of input and output ports, illustrated in FIGS. 2 and 3A at 54 and 56, are connected to a second additional throttle assembly (36 in FIG. 1), and operate, in the same manner that ports 42 and 44 are attached, and operate with regard to, to the original throttle assembly and that ports 50 and 52 are attached, and operate with regard to, the first additional throttle assembly. More specifically, the second additional throttle assembly (36 of FIG. 1) features first and second position sensors which send signals to the module 20. If the signals correlate, the vehicle engine speed is adjusted based on the position of the throttle of throttle assembly 36. If the signals from the first and second sensors of the second additional throttle assembly 36 of FIG. 1 do not correlate, however, the module 20 sends a signal to the OEM engine ECM indicating that the vehicle engine speed should be set to idle. The second additional throttle assembly could be present, for example, in a second additional cab or standup box of a vehicle that permits the vehicle to be steered from the original cab or either additional cab.

The module 20 could instead be constructed to accommodate only one additional throttle assembly or more than two additional throttle assemblies.

With reference to FIG. 1, the system is preferably provided with a switch 60 which communicates with the module 20 via line 62. Line/lines 62 of FIG. 1 communicate with the switching ports 64 of FIGS. 2 and 3. As a result, the throttle assembly (22, 30 or 36 of FIG. 1), and thus the vehicle cab, standup box or operation location, may be selected by manipulating the switch 60.

Figure 4:
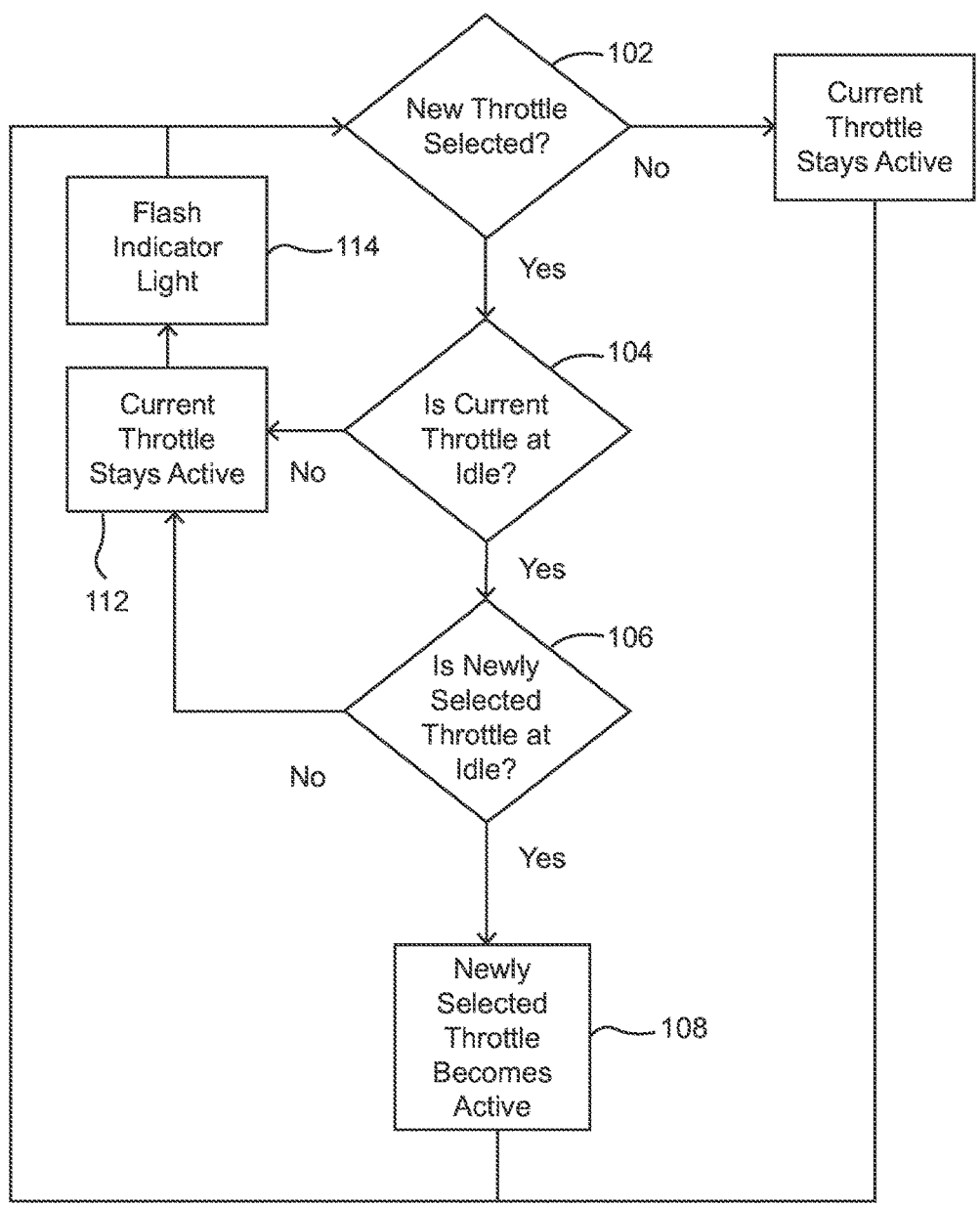
FIG. 4 is a flow chart illustrating processing performed by the controller of the electronic switching module of FIGS. 1-3.

In addition to the correlation error conditions described above, the module 20 will not permit a user to switch to different throttle if the currently operational throttle and the newly selected throttle are not at idle. More specifically, with reference to block 102 of FIG. 4, a user may select a new throttle, i.e. one that is different from the currently operational throttle, by selecting the new throttle via switch 60 (FIG. 1). When such a selection is made, the electronic switching module checks to determine if the currently active throttle is in the idle position (block 104 of FIG. 4). If the currently active throttle is at idle, the module checks to determine if the newly selected throttle (i.e. the throttle newly indicated by the setting of switch 60) is also in the idle position (block 106 of FIG. 4). It should be understood that the order within which the throttle positions is checked may alternatively be reversed (i.e. block 106 of FIG. 4 could come before block 104) in the flow chart of FIG. 4. If both the currently active throttle and the newly selected throttle are in the idle positions, the newly selected throttle becomes active, as indicated by block 108 of FIG. 4. As illustrated by block 112 of FIG. 4, however, if either the current throttle or the newly selected throttle are not in the idle positions, the currently operational throttle remains active, and the newly selected throttle remains inactive. If the switch 60 (FIG. 1) remains configured to select the new throttle, once both throttles go to idle, the module automatically switches control over to the newly selected throttle.

As shown in FIG. 1, the system includes an indicator light 66 which communicates with the module 20 via line 67. The indicator light 66 may be mounted in the vehicle cab dashboard, standup cab or anywhere else on the vehicle. The module configures the light 66 so that it is "off" when everything is operating without any problems. In the event that the vehicle engine is set to idle by the module, as described above, the indicator light 66 is illuminated in a solid (non-flashing) "on" fashion. With reference to block 114 of FIG. 4, if the user attempt to select a different throttle using the throttle selection switch 60 (FIG. 1), and either the throttle currently in use or the desired/newly selected throttle is depressed, the indicator light will flash.

As indicated at 70 in FIGS. 2 and 3A, the module also features ports that accommodate additional vehicle accessories, controls or mechanisms such as lights, etc. As a result, operation of these accessories, controls or mechanisms may be transferred to the appropriate cab or standup box along with the corresponding throttle control via switch 60.

The relays 70 of FIGS. 2 and 3A communicate with relay circuitry, indicated at 86 in FIG. 3A. An embodiment of the relay circuitry is indicated in general at 86 in FIG. 7.

As illustrated in FIG. 3A, all of the throttle assembly ports 42, 44, 50, 52, 54 and 56 communicate with an analog outputs circuitry 80 and analog inputs circuitry 82. In addition, the ECM ports 46 and 48 communicate with the analog outputs circuitry 80. The module 20 (FIG. 1) also includes power supply circuitry, illustrated at 84 in FIG. 3A.

As may be seen from FIGS. 3A and 3B, the analog outputs circuitry 80, analog inputs circuitry 82, power supply 84 and relays circuitry 86 all communicate with the controller 92 (FIG. 3B) of the module 20. The controller may be a microcontroller (present in the illustrated embodiment), a microprocessor or any circuitry or other processing component known in the art. The microcontroller 92 directs and controls all functions of the module 20 including, but not limited to, the comparison of the signals from the first and second throttle position sensors for each throttle assembly 22, 30 and 36 from the ports 42, 44, 50, 52, 54 and 56 (as described above), the provision of a "clean" signal, including an idle signal, to the engine ECM via ports 46 and 48, configuration of the module based on the system configuration switch (60 of FIG. 1) and transfer of control, or restriction of same, from a throttle in use to a newly selected throttle.

With regard to the provision of a "clean" signal to the engine ECM, the controller ensures that the outputs to the engine ECM are always within range/tolerance for what the ECM expects. It does this by keeping the outputs to FIGS. 2, 46b and 48b at exactly a 2:1 ratio for any given throttle command from idle to 100% while monitoring the supply voltage that the ECM provides to 46a and 48a in order to adjust for any variance from the nominal supply of 5 volts DC. In the event of an error with a throttle pedal or the wiring between the pedal and control module, the control module drops the output to an idle command and illuminates the indicator lamp to notify the operator of a problem.

The embodiments of the electronic switching module described above therefore enable a vehicle to have multiple throttle controls while also providing the OEM engine ECM with a clean signal so that no error codes, warning lights or the like are displayed by the vehicle instrumentation. Embodiments of the electronic switching module also provide a signal to the ECM that the vehicle engine speed should be set to idle when a comparison of the signals from the first and second throttle position sensors from any one of the selected multiple throttle assemblies does not correlate with regard to a predetermined relationship. In addition, the embodiments of the electronic switching module accommodate controls for vehicle accessories such as, for example, wipers and lights.

While the preferred embodiments of the invention have been shown and described, it will be apparent to those skilled in the art that changes and modifications may be made therein without departing from the spirit of the invention, the scope of which is defined by the following claims.

What is claimed is:

1. An electronic switching module for connecting first and second throttle assemblies to an electronic control module of a vehicle that controls an engine of the vehicle, said electronic switching module comprising:
   a. first throttle assembly configured to receive first throttle primary sensor position data from a first throttle primary position sensor connected to the first throttle assembly and first throttle secondary sensor position data from a first throttle secondary position sensor connected to the first throttle assembly;
   b. second throttle assembly configured to receive second throttle primary sensor position data from a second throttle primary position sensor connected to the second throttle assembly and second throttle secondary sensor position data from a second throttle secondary position sensor connected to the second throttle assembly;
   c. an electronic control module port configured to communicate with the electronic control module;
   d. a controller connected to the first and second throttle assembly ports and the electronic control module port; and
   e. a switch port in communication with the controller and configured to communicate with a switch for selecting between the first throttle assembly and the second throttle assembly;
   wherein said controller is configured to check the first throttle primary sensor position data and the first throttle secondary sensor position data as well as the second throttle primary sensor position data and the second throttle secondary sensor position data and send an engine idle signal to the electronic control module via the electronic control module port when any of the first throttle primary sensor position data, the first throttle secondary sensor position data, the second throttle primary sensor position data or the second throttle secondary sensor position data fails to indicate an idle throttle position and the switch is manipulated to change a throttle selection;
   wherein said controller is configured to receive and perform a first comparison between the first throttle primary sensor position data and the first throttle secondary sensor position data to determine if there is a problem with one of the first throttle primary position sensor and the first throttle secondary position sensor; wherein the controller determines that there is a problem with one of the first throttle primary position sensor and the first throttle secondary position sensor when the first comparison does not show a first predetermined relationship; and wherein the controller is further configured, to send the engine idle signal to the electronic control module via the electronic control module port when the first comparison does not show the first predetermined relationship; and
   wherein said controller is configured to receive and perform a second comparison between the second throttle primary sensor position data and the second throttle secondary sensor position data to determine if there is a problem with one of the second throttle primary position sensor and the second throttle secondary position sensor; wherein the controller determines that there is a problem with one of the second throttle primary position sensor and the second throttle secondary position sensor when the second comparison does not show a second predetermined relationship; and wherein the controller is further configured to send the engine idle signal to the electronic control module via the electronic control module port when the second comparison does not show the second predetermined relationship.

2. The electronic switching module of claim 1 further comprising an indicator light port in communication with the controller and configured to communicate with an indicator light, said controller configured to illuminate the indicator light when the first comparison between the first throttle primary sensor position data and the first throttle secondary sensor position data does not show the first predetermined relationship or the second comparison between the second throttle primary sensor position data and the second throttle secondary sensor position data does not show the second predetermined relationship.

3. The electronic switching module of claim 2 wherein the controller is configured to flash the indicator light when the first comparison between the first throttle primary sensor position data and the first throttle secondary sensor position data does not show the first predetermined relationship or the second comparison between the second throttle primary sensor position data and the second throttle secondary sensor position data does not show the second predetermined relationship.

4. The electronic switching module of claim 2 further comprising third throttle assembly ports in communication with the controller and configured to receive third throttle primary sensor position data and third throttle secondary sensor position data and wherein said controller is configured to receive and perform a third comparison between the third throttle primary sensor position data and the third throttle secondary sensor position data and send the engine idle signal to the electronic control module via the electronic control module port when the third comparison does not show a third predetermined relationship.

5. The electronic switching module of claim 1 further comprising an indicator light port in communication with the controller and configured to communicate with an indicator light, said controller configured to illuminate the indicator light when any of the first throttle primary sensor position data, the first throttle secondary sensor position data, the second throttle primary sensor position data or the second throttle secondary sensor position data fails to indicate the idle throttle position and the switch is manipulated to change the throttle selection.

6. The electronic switching module of claim 1 wherein a throttle selection change is made if the first throttle primary sensor position data, the first throttle secondary sensor position data, the second throttle primary sensor position data and the second throttle secondary sensor position data all indicate idle throttle positions.

7. The electronic switching module of claim 1 further comprising accessory, control or mechanism ports in communication with the controller and configured to communicate with vehicle accessories, controls or mechanisms.

8. The electronic switching module of claim 1 wherein the first predetermined relationship and the second predetermined relationship are both a ratio of 2:1.

9. A system for controlling a speed of a vehicle engine comprising:
   a. an electronic control module configured to communicate with the vehicle engine;
   b. a first throttle assembly including a first throttle, a first throttle primary position sensor and a first throttle secondary position sensor;
   c. a second throttle assembly including a second throttle, a second throttle primary position sensor and a second throttle secondary position sensor;
   d. an electronic switching module including:
      i) first throttle assembly ports connected to the first throttle primary position sensor and the first throttle secondary position sensor so as to receive first throttle primary sensor position data and first throttle secondary sensor position data;
      ii) second throttle assembly ports connected to the second throttle primary position sensor and the second throttle secondary position sensor so as to receive second throttle primary sensor position data and second throttle secondary sensor position data;
      iii) an electronic control module port in communication with the electronic control module;
      iv) a controller connected to the first and second throttle assembly ports and the electronic control module port;
      wherein said controller is configured to receive and perform a first comparison between the first throttle primary sensor position data and the first throttle secondary sensor position data to determine if there is a problem with one of the first throttle primary position sensor and the first throttle secondary position sensor; wherein the controller determines that there is a problem with one of the first throttle primary position sensor and the first throttle secondary position sensor when the first comparison does not show a first predetermined relationship; and wherein the controller is further configured, to send an engine idle signal to the electronic control module via the electronic control module port when the first comparison does not show the first predetermined relationship;
      wherein said controller is configured to receive and perform a second comparison between the second throttle primary sensor position data and the second throttle secondary sensor position data to determine if there is a problem with one of the second throttle primary position sensor and the second throttle secondary position sensor; wherein the controller determines that there is a problem with one of the second throttle primary position sensor and the second throttle secondary position sensor when the second comparison does not show a second predetermined relationship; and wherein the controller is further configured, to send the engine idle signal to the electronic control module via the electronic control module port when the second comparison does not show the second predetermined relationship; and
   e. a switch for selecting between the first throttle assembly and the second throttle assembly, wherein the controller checks the first throttle primary sensor position data and the first throttle secondary sensor position data as well as the second throttle primary sensor position data and the second throttle secondary sensor position data and sends the engine idle signal to the electronic control module via the electronic control module port when any of the first throttle primary sensor position data, the first throttle secondary sensor position data, the second throttle primary sensor position data or the second throttle secondary sensor position data fails to indicate an idle throttle position and the switch is manipulated to change a throttle selection.

10. The system of claim 9 further comprising an indicator light in communication with the controller, said controller illuminating the indicator light when the first comparison between the first throttle primary sensor position data and the first throttle secondary sensor position data does not show the first predetermined relationship or the second comparison between the second throttle primary sensor position data and the second throttle secondary sensor position data does not show the second predetermined relationship.

11. The system of claim 9 further comprising an indicator light in communication with the controller, said controller illuminating the indicator light when any of the first throttle primary sensor position data, the first throttle secondary sensor position data, the second throttle primary sensor position data or the second throttle secondary sensor position data fails to indicate the idle throttle position and the switch is manipulated to change the throttle selection.

12. The system of claim 11 wherein a throttle selection change is made if the first throttle primary sensor position data, the first throttle secondary sensor position data, the second throttle primary sensor position data and the second throttle secondary sensor position data all indicate idle throttle positions.

13. The system of claim 9 wherein the electronic switching module further includes accessory, control or mechanism ports in communication with the controller and configured to communicate with vehicle accessories, controls or mechanisms.

14. The system of claim 9 wherein the first predetermined relationship and the second predetermined relationship are both a ratio of 2:1.

15. A method for switching control of a vehicle engine from a first throttle assembly, including a first throttle, a first throttle primary position sensor and a first throttle secondary position sensor, to a second throttle assembly, including a second throttle, a second throttle primary position sensor and a second throttle secondary position sensor, the method comprising the steps of:
   a. providing a controller in communication with the first and second throttle assemblies and the vehicle engine and a throttle assembly selector switch in communication with the controller;
   b. receiving first throttle primary sensor position data and first throttle secondary sensor position data into the controller;
   c. receiving second throttle primary sensor position data and second throttle secondary sensor position data into the controller;
   d. performing a first comparison between the first throttle primary sensor position data and the first throttle secondary sensor position data using the controller to determine if there is a problem with one of the first throttle primary position sensor and the first throttle secondary position sensor;
   e. determining with the controller that there is a problem with one of the first throttle primary position sensor and the first throttle secondary position sensor when the first comparison does not show a first predetermined relationship;
   f. sending an engine idle signal from the controller to the vehicle engine via an electronic control module when the first comparison between the first throttle primary sensor position data and the first throttle secondary sensor position data does not show the first predetermined relationship;

g. performing a second comparison between the second throttle primary sensor position data and the second throttle secondary sensor position data using the controller to determine if there is a problem with one of the second throttle primary position sensor and the second throttle secondary position sensor;

h. determining with the controller that there is a problem with one of the second throttle primary position sensor and the second throttle secondary position sensor when the second comparison does not show a second predetermined relationship;

i. sending the engine idle signal from the controller to the vehicle engine via the electronic control module when the second comparison between the second throttle primary sensor position data and the second throttle secondary sensor position data does not show the second predetermined relationship;

j. checking the first throttle primary sensor position data and the first throttle secondary sensor position data as well as the second throttle primary sensor position data and the second throttle secondary sensor position data using the controller when the throttle assembly selector switch is manipulated to change vehicle engine control from the first throttle assembly to the second throttle assembly; and k. sending the engine idle signal to the vehicle engine via the electronic control module when any of the checked first throttle primary sensor position data, the first throttle secondary sensor position data, the second throttle primary sensor position data or the second throttle secondary sensor position data fails to indicate an idle throttle position.

16. The method of claim 15 further comprising the steps of:

l. providing an indicator light;

m. illuminating the indicator light when any of steps f, i or k is performed.

* * * * *

UNITED STATES PATENT AND TRADEMARK OFFICE
CERTIFICATE OF CORRECTION

| | |
|---|---|
| PATENT NO. | : 9,835,095 B2 |
| APPLICATION NO. | : 14/696018 |
| DATED | : December 5, 2017 |
| INVENTOR(S) | : Brandon Hall et al. |

It is certified that error appears in the above-identified patent and that said Letters Patent is hereby corrected as shown below:

In Column 5, Claim 1, Line 16, that portion of the claim reading "first throttle assembly configured to receive" should read -- first throttle assembly ports configured to receive --.

In Column 5, Claim 1, Line 22, that portion of the claim reading "second throttle assembly configured to receive" should read -- second throttle assembly ports configured to receive --.

In Column 5, Claim 1, Lines 61-62, that portion of the claim reading "further configured, to send" should read -- further configured to send --.

In Column 7, Claim 9, Line 38, that portion of the claim reading "further configured, to send" should read -- further configured to send --.

In Column 7, Claim 9, Lines 54-55, that portion of the claim reading "further configured, to send" should read -- further configured to send --.

Signed and Sealed this
Thirtieth Day of January, 2018

Joseph Matal
*Performing the Functions and Duties of the
Under Secretary of Commerce for Intellectual Property and
Director of the United States Patent and Trademark Office*

Page 1 of 1